(12) United States Patent
Pinotti

(10) Patent No.: US 11,756,141 B2
(45) Date of Patent: Sep. 12, 2023

(54) COMMUNICATIONS SYSTEMS, METHODS, AND DEVICES

(71) Applicant: Veronica Pinotti, Milan (IT)

(72) Inventor: Veronica Pinotti, Milan (IT)

( * ) Notice: Subject to any disclaimer, the term of this patent is extended or adjusted under 35 U.S.C. 154(b) by 941 days.

(21) Appl. No.: 16/263,396

(22) Filed: Jan. 31, 2019

(65) Prior Publication Data

US 2019/0236734 A1 Aug. 1, 2019

Related U.S. Application Data

(60) Provisional application No. 62/624,374, filed on Jan. 31, 2018.

(51) Int. Cl.
| | |
|---|---|
| *G06Q 10/10* | (2023.01) |
| *G06Q 10/06* | (2023.01) |
| *G06Q 30/02* | (2023.01) |
| *G06Q 30/06* | (2023.01) |
| *G06Q 10/02* | (2012.01) |
| *G06Q 50/18* | (2012.01) |
| *H04W 4/90* | (2018.01) |
| *H04W 76/50* | (2018.01) |
| *H04W 4/021* | (2018.01) |

(Continued)

(52) U.S. Cl.
CPC .............. *G06Q 50/18* (2013.01); *G06Q 10/10* (2013.01); *H04W 4/021* (2013.01); *H04W 4/023* (2013.01); *H04W 4/90* (2018.02); *H04W 76/50* (2018.02); *H04M 15/56* (2013.01)

(58) Field of Classification Search
CPC ....... G06Q 50/18; G06Q 10/10; H04W 4/021; H04W 4/023; H04W 4/90; H04W 76/50; H04M 15/56

USPC ................. 705/1.1–912, 320, 325, 311, 342
See application file for complete search history.

(56) References Cited

U.S. PATENT DOCUMENTS

| | | | |
|---|---|---|---|
| 8,965,988 B1 * | 2/2015 | Negahban | ............... H04W 4/90 709/206 |
| 9,232,040 B2 * | 1/2016 | Barash | ............... G08B 21/0211 |

(Continued)

OTHER PUBLICATIONS

Long, Joshua, "The Evolution of iOS Security and Privacy Features," Intego.com (www.intego.com/mac-security-blog/the-evolution-of-ios-security-and-privacy-features/), The Mac Security Blog, Feb. 29, 2016. (Year: 2016).*

*Primary Examiner* — Jonathan P Ouellette
(74) *Attorney, Agent, or Firm* — HOWSON & HOWSON LLP

(57) ABSTRACT

Systems, methods, and devices for implementing a communications system having a facility located at a location, first and second communications devices, a data storage device, and a server. The first communications device is arranged to send an alert to a communications server and receive a message from the server in response to the alert, where the first communications device is within a first proximity of the facility and the alert indicates an event type. The second communications device is arranged to receive a notification from the server associated with the alert, where the second communication device is within a second proximity of the facility. The server is arranged to send the notification associated with the alert to the second communications device, such that the notification includes the event type, an identifier of the facility, and a user identifier of the user associated with the first communications device.

15 Claims, 12 Drawing Sheets

(51) Int. Cl.
    *H04W 4/02*     (2018.01)
    *H04M 15/00*     (2006.01)

(56) References Cited

U.S. PATENT DOCUMENTS

| | | | |
|---|---|---|---|
| 9,342,976 B2 * | 5/2016 | Pfeffer | H04W 76/50 |
| 10,812,420 B2 * | 10/2020 | Mottur | H04L 67/18 |
| 2004/0128353 A1 * | 7/2004 | Goodman | H04L 51/02 |
| | | | 709/204 |
| 2014/0365390 A1 | 12/2014 | Braun | |
| 2014/0368601 A1 | 12/2014 | deCharms | |
| 2016/0100302 A1 * | 4/2016 | Barash | H04M 1/72418 |
| | | | 455/404.2 |
| 2016/0366086 A1 * | 12/2016 | Solomon | H04W 4/12 |
| 2017/0191843 A1 * | 7/2017 | Yadav | H04W 4/02 |
| 2017/0322682 A1 * | 11/2017 | Humayun | G16H 40/20 |
| 2018/0025453 A1 * | 1/2018 | Redmon | G06F 3/04842 |
| | | | 348/14.02 |
| 2018/0330815 A1 * | 11/2018 | Demir | G08B 7/066 |
| 2019/0156406 A1 * | 5/2019 | Landau | G06Q 30/0645 |

* cited by examiner

400

Group A

| User ID | Location |
|---------|----------|
| User A1 | 1 |
| User A2 | 1 |
| User A3 | 3 |

Group B

| User ID | Location |
|---------|----------|
| User B1 | 2 |
| User B2 | 3 |
|  |  |

Facilities

| Facility | Location |
|---|---|
| Facility 1 | 1 |
| Facility 2 | 2 |
| Facility 3 | 3 |

| Data | Time Stamps |
|---|---|
| Images | T1 |
| Notes | T2 |
| Messages | T3 |
| Audio Recordings | T4 |
| Video Recordings | T5 |
| Chat Information | T6 |
| Status | T7 |

FIG. 6

COMMUNICATIONS SYSTEMS, METHODS, AND DEVICES

CROSS-REFERENCE TO RELATED APPLICATIONS

This application claims the benefit of U.S. Provisional Application No. 62/624,374, filed on Jan. 31, 2018, the content of which is hereby incorporated herein by reference in its entirety.

FIELD OF THE DISCLOSURE

The disclosure relates generally to communications systems, methods and devices. More particularly, in various aspects, the disclosure relates to efficient communications techniques among members associated with an organization.

INTRODUCTION

Certain entities, such as companies, often have multiple facilities that are geographically distributed regionally, nationally, and/or internationally. Key decision-makers, knowledgeable personnel, senior corporate officers, and/or professional personnel with specialized expertise (e.g., legal personnel) are often distributed among the various geographically dispersed facilities of the entity. Hence, any one of the various facilities, at any given time, may lack the necessary personnel to respond to an urgent demand for information at that facility from, for example, a government or other investigative agency demanding such information. Typically, such demands may be overly broad, vague, or confusing to local personnel at a particular facility. The agency may demand the information immediately or with a very limited response time. Conventional communications techniques such as mobile telephone networks, land-line phones, email, and texting often prove deficient to enable local personnel to contact necessary personnel that can effectively respond to such time sensitive demands in an appropriate manner, especially when key personnel and their contact information may change over a period of time.

Hence, there is a need for systems and techniques that enable appropriate entity personnel, who may be geographically dispersed, to effectively communicate and respond to time sensitive information requests at a particular facility of an entity.

SUMMARY

The application, in various embodiments, addresses the deficiencies associated with current communications systems. Generally, the present disclosure includes systems, methods, and devices that enable a corporate entity or other organization with multiple geographically distributed facilities to efficiently and effectively respond to an urgent information demand (e.g., order of entrance) at one of their facilities, which may not have the necessary experience and sufficiently senior personnel to appropriately respond to such a demand. The systems, methods, and devices described herein enable a user at a particular facility to initiate an alert via an application running on their communications device, e.g., a mobile telephone. The alert can be sent to a system server that can distribute notifications to applications running on communication devices, e.g., mobile telephones, of designated personnel such as senior managers and legal counsel. The systems, methods, and devices may enable a user at the facility to immediately send relevant information (e.g., an image of the order) to the device of a designated legal professional and/or more immediately obtain legal advice on how to respond to an order. The systems, methods, and devices may provide a user at the facility with relevant information such as the proximity of a legal professional and an estimated time of arrival of the legal professional at the facility. The systems, methods, and devices allow for the creation, capture, and storage of data associated with communications among user devices over a period of time. Hence, a comprehensive, secure, and legally privileged record of events and data associated with an investigation can be efficient created and maintained.

In one aspect, the present disclosure includes a system having a first facility located at a first location; a first communications device arranged to: i) send an alert to a communications server and ii) receive a message from the server in response to the alert, where the first communications device is within a first proximity of the first facility, and wherein the alert indicates an event type. The system includes a second communications device arranged to receive a notification from the server associated with the alert, where the second communications device is within a second proximity of the first facility. The system also includes a data storage device arranged to store the location of the first facility, a detected location of the first communications device, and a detected location of the second communications device. The system further includes a server, in electronic communication with the first and second communications devices via a network, that is arranged to: i) receive the alert from the first communications device; ii) determine that the second proximity of the second communications device is within a proximity threshold of the first facility, where the second proximity is determined by comparing the first location with the detected location of the second communications device; and iii) send the notification associated with the alert to the second communications device, such that the notification includes the event type, an identifier of the first facility, and a user identifier of the user associated with the first communications device.

In some implementations, a third communications device is arranged to receive the notification from the server associated with the alert. The third communications device may be within a third proximity of the first facility that is within the proximity threshold of the first facility. The server may establish a communications connection between a first chat application of the first communications device and a second chat application of the second communications device. The first chat application and the second chat application may be clients of a communications management application implemented by the server. The communications channel may be encrypted.

In some implementations, the server establishes a communications connection between a first chat application of the first communications device, the second chat application of the second communications device, and the third chat application of the third communications device, where the third chat application is also a client of the communication management application. The event type may include at least one of a raid, an inspection, an investigation, a demand for information, an order of entrance, a confiscation action, a seizure action, an arrest, and execution of a search warrant. The message sent to the first communications device may include instructions based at least on the event type.

In some configurations, the first communications device includes an image capture device, e.g., a camera, arranged to capture one or more images associated with the event type. The one or more images may include at least one of an order of entrance, a search warrant, seizure order, and a demand. The first communications device may send the one or more images to at least one of the server, the second communications device, and a third communications device.

In one implementations, a first user is associated with the first communications device, a second user is associated with the second communications device, and a third user is associated with a third communications device. The first user and second user may be members of a first group, while the third user may be a member of a second group. The members of the first group may be designated and managed by a first administrator, while the members of the second group may be designated and managed by a second administrator. The first group may include employees of a company, while the second group may include legal professionals.

The language used in an alert, message, or notification may be based on a detected geographic location of a communications device or may be designated by an administrator via a server. The message sent to a first communications device may include an indication of at least one of the distance of the second communications device from the first location and amount of time for the second communications device to arrive at the first location when traveling toward the first location. The message may also include an indication of at least one of the distance of a third communications device from the first location and amount of time for the third communications device to arrive at the first location when traveling toward the first location.

In some implementations, the data storage device is configured to store all or a portion of the data communicated via the communication channel. The data may include at least one of an image, notes, text, messages, audio recordings, video recording, status of the event, status of a response to the event, status of information provided to a third party, time stamps associated with captured data, a history of captured data over a period of time, and other chat information. The first communications device, the second communications device, and/or the third communications device may store a portion of the data.

A second aspect of the present disclosure relates to a method of communication. The method comprises providing a first facility being located at a first location. Further, the method comprises providing a first communications device arranged to: i) send an alert to a communications server and ii) receive a message from the server in response to the alert, the first communications device being within a first proximity of the first facility. The alert can indicate an event type. The method further comprises providing a second communications device arranged to receive a notification from the server associated with the alert, the second communications device being within a second proximity of the first facility. The method also comprises providing a data storage device arranged to store the first location, a detected location of the first communications device, and a detected location of the second communications device. Further, the method comprises providing a server, in electronic communication with the first and second communications devices via a network, arranged to receive the alert from the first communications device, determine that the second proximity of the second communications device is within a proximity threshold of the first facility, where the second proximity is determined by comparing the first location with the detected location of the second communications device, send the notification associated with the alert to the second communications device, and where the notification includes the event type, an identifier of the first facility, and a user associated with the first communications device.

A third aspect of the present disclosure relates to a system comprising a first facility being located at a first location, first and second communication means, means for storing the first location, a detected location of the first communications device and a detected location of the second communications device, and a server in electronic communication with the first and second communications devices via a network. The first communication means includes means for i) sending an alert to a communications server and ii) receive a message from the server in response to the alert, the first communications device being within a first proximity of the first facility, where the alert indicates an event type. The second communication means includes means for receiving a notification from the server associated with the alert, the second communications device being within a second proximity of the first facility. The server includes means for receiving the alert from the first communications device, determining that the second proximity of the second communications device is within a proximity threshold of the first facility, where the second proximity is determined by comparing the first location with the detected location of the second communications device, sending the notification associated with the alert to the second communications device, and where the notification includes the event type, an identifier of the first facility, and a user identifier of the user associated with the first communications device.

DRAWINGS

The foregoing and other objects and advantages of the disclosure will be appreciated more fully from the following further description thereof, with reference to the accompanying drawings. The skilled person in the art will understand that the drawings, described below, are for illustration purposes only. The drawings are not intended to limit the scope of the applicant's teaching in any way.

FIG. 1 includes a diagram of a communications system according to aspects of the disclosure;

FIG. 2 includes a functional block diagram of a communications device;

FIG. 3 includes a diagram of a wireless communications system according to aspects of the disclosure; and FIG. 4A shows a table of user identifiers associated with a first group;

FIG. 4B shows another table of user identifiers associated with a second group;

FIG. 5 shows a table of facilities;

FIG. 6 shows a table of data and associated information stored by a server and/or communication device according to aspects of the disclosure;

DESCRIPTION

The application describes communications systems, methods, and devices that enable efficient, time-sensitive, and effective communications among designated users of an entity when disseminating information associated with a particular facility of the entity.

Figure 1:
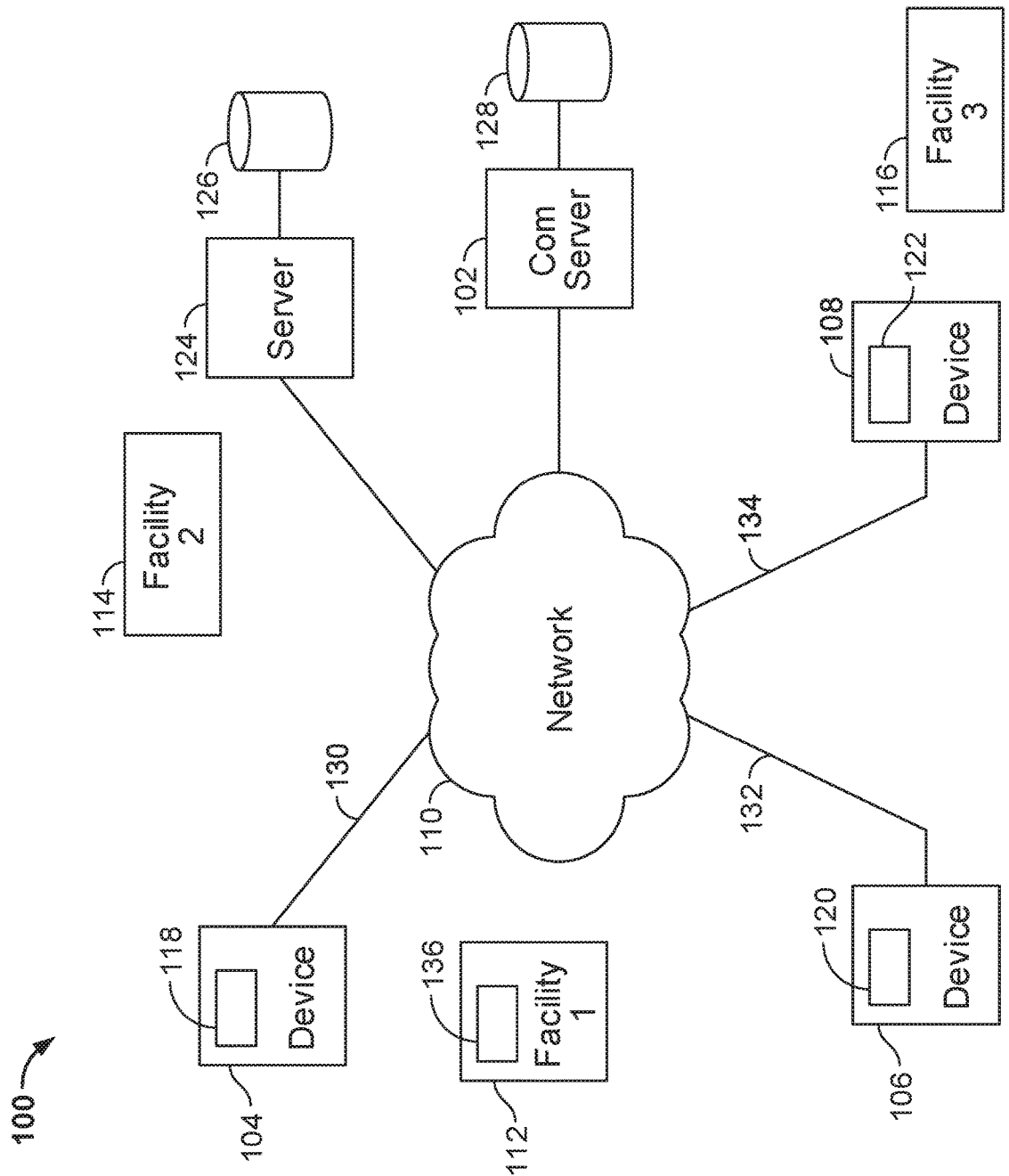

FIG. 1 includes a diagram of a communications system 100 according to aspects of the disclosure. The system 100 includes communications devices 104, 106, and 108. The devices 104, 106, and 108 may communicate with the network 110 via communications links 130, 132, and 134 respectively. The links 130, 132, and 134 may be wireless or wired links. Hence, devices 104, 106, and 108 may be mobile devices (e.g., cellular telephones, smart phones, computer tablets, and so on). One or more of the device may alternatively be personal computers and/or use a wired link to communicate with network 110. Network 110 may be a heterogeneous network including various networks such as the Internet, a public land mobile network (PLMN) such as a GSM or LTE network, a wide area network (WAN), a Wifi and/or 802.11 network, a Bluetooth interface, an Ethernet, and the like. The devices 104, 106 and 108 will accordingly implement air interface standard and data network standards that support communications with network 110. The system 100 includes facilities 112, 114, and 116. Each facility may include physical building wherein operations associated with an entity, e.g., a company, are performed including, for example, manufacturing, administration, sales, data archiving, vending, product distribution, and so on. Each facility such as facility 112 may be a custodian of entity information 136 such as, for example, purchase and sales data, employee data, customer data, contracts, product data, and any information acquired, created, and/or stored by an entity.

The system 100 includes a communications management server 102. The server 102 may interface with communications applications 118, 120, and 122 running on each of devices 104, 106, and 108 respectively. In one configuration, each communications application 118, 120, and 122 interacts with the server 122 in a client-server relationship. Server 102 may include a web server to facilitate certain types of communications with applications 118, 120, and 122. Server 102 may function as an intermediate server that stores and forwards communications from one application, e.g., application 118, to one or more other applications, e.g., applications 120 and 122. Server 102 may perform authorization and access control functions associated with applications 118, 120, and 122. For instance, a user accessing application 118 on device 104 may be required to enter a username and password to access and/or enable functions of application 118. The device 104 may send the username and password to server 102, which then authenticates the user by confirming that the password is correct. Alternatively, the access control function may be performed locally by application 118. The server 102 may include a database 128 configured to store data associated with system 100 such as for example, user identifiers (user IDs), facility identifiers, device location data, facility location data, data exchanged among applications 118, 120, and 122 over a period of time, history of interactions and/or actions of applications 118, 120, and 122, images (e.g., photos and videos) captured by devices 102, 104, and 106, notes, text messages, audio recordings, video recordings, chat messages, chat information, and/or investigation status information along with timestamps indicating time-related events associated with the data (e.g., date/time of acquisition or capture, date/time of transfer to an investigator, date/time of release by investigation, and so on). The database 128 may store information for a period of time and/or may store types of data for periods of time as defined by server 102. The server 102 may support chat features such as implemented by, for example, the WhatsApp application or another VoIP application.

The system 100 may include a server 124 that separately support chat features among the applications 118, 120, and 122, while coordinating with server 102 to enable management of user devices 104, 106, and 108. For example, server 124 may implement the WhatsApp application, or a similar VoIP application, to enable applications 118, 120, and 122 to communicate with each other. Server 102 and 124 may coordinate to facilitate communications among applications 118, 120, and 122, to manage alerts and notifications among applications 118, 120, and 122, manage response messages sent to applications 118, 120, and 122, to store all data captured, created, and exchanged among applications 118, 120, and 122, to store and update location data of device 102, 104, and 106, to store and update user and device information, to store and update group affiliation information of users, and so on. Database 126 and/or 128 may store all or a portion of the data associated with operations of system 100.

In operation, where device 104 is associated with and in the possession of an employee located at facility 112, the employee user of device 104 may activate communications application 118, which may be an IOS or Android application running on device 104. The application 118 may present an alert button via a touchscreen and/or graphical user interface (GUI) of the device 104. By pressing the alert button, the user activates an alert function within application 118, which sends an alert message from device 104 to communications server 102. Server 102, in turn, determines who should receive a notification of the alert issued from device 104. Server 102 may access one or more tables, as illustrated in FIGS. 4A and 4B, indicating which users associated with employer should receive a notification of the alert. The user of device 104 may be a local manager at facility 112. When an investigative agency arrives at facility 112 with an order of entrance or search warrant to seize certain information, the local manager can activate the communications application 118 on her mobile phone (e.g., device 104) and initiate the alert to trigger notifications to personnel who can more appropriately respond to the order or warrant.

The application 118 may include a list and contact information of appropriate personnel which the user may access to initiate more immediate communications with a more senior manager and/or legal counsel. The application 118 and/or server 102 may check the geographic location of all personnel (members of a group assigned to provide advice and support to facility 112) and, based on the determined locations, determine which personnel should be contacted. For instance, the server 102 and/or application 118 may determine that device 106 is within a threshold proximity to facility 112 (e.g., within a threshold distance proximity of 50 Kilometers), while device 108 is about 75 Kilometers away from facility 112, which is above the threshold proximity. Hence, the server 102 and/or application 118 of device 104 may send an alert and/or notification to device 106 for assistance, while not sending an alert and/or notification to device 108. But, if the user of device 108 is a member of a legal group, then the threshold proximity of the legal group may be higher (e.g., 100 Kilometers), in which case, the alert and/or notification will be sent to device 108 as well. In response to the alert, the server 102 or one or both of devices 106 and 108 may send a message to device 102 indicating the distance from and/or time to arrive at facility 112. This information may be displayed to the user of device 104 via application 118 to enable to user to negotiate with the investigative agency to possibly wait for appropriate company personnel to arrive before executing its order or warrant.

The user of device 104 may utilize a camera to capture one or more images of the order of entrance or warrant, which the application 118 can then send, via server 102, to one or more other applications, such as applications 120 and 122 or devices 106 and 108. If, for example, the user of device 108 is a legal counsel, the user of device 108 will be able to more immediately review the order or warrant, even while many Kilometers or miles from facility 112, and possibly provide legal advice to the local manager or interact with the investigative agency at the facility 112.

Any chat, texts, calls, images, or other data including timestamps involved in interactions with the investigative agency at facility 112 will be recorded and stored at database 126, database 128, and/or in a memory within one or more devices 104, 106, and 108 for a defined period of time. For instance, data associated an investigation of facility 112 and/or other facilities, whether extending over a period of weeks, months, or years, may be stored for later retrieval. All of the data, including recorded text, message, conversations, audio recording, and video recording may be protected and legally privileged depending on the local or national laws where the facility, users, and system 100 components are located. An administrator of server 102 and/or 124 may control access to and/or the distribution of data stored in database 126 and/or 128. Separate administrators, each associated with a different group, may be designated to manage users and their access to certain data created, acquired, and/or exchanged in system 100. For instance, the users of devices 104 and 106 may be members of an employee group associated with facility 112, while the user of device 108 may be a legal counsel who is not an employee, but is responsible to providing legal advice associated with facility 112. An administrator of the employee group may be able to assign or change employee members of a group associated with facility 112, but not have authority to assign member of a legal group associated with facility 112. An administrator of the legal group will have authority to manage users of the legal group associated with facility 112, but not the ability to manage members of.

Certain features of components of system 100 may include:

User—Mobile Apps (e.g., one or more of applications 118, 120, and 122)
  Logs in/requires a reset password o Views guidelines (Content Management System (CMS) content)
  Views the tutorial (CMS section not requiring authentication)
  Activates alert for its location
  Uses the internal chat (according to preset permissions)
  Displays distance from the attorney assigned to the emergency's office
  Receives push notifications
  Provides the ability to create a user (Mobile Apps) that is transversal for all the locations in the group. Basically, some end-user users must be able to receive notifications/chat from all locations of their company Lawyer—Mobile Apps (e.g., one or more of applications 118, 120, and 122)
  Logs in/requires a reset password
  Views and manages one or more emergencies
  Uses the chat (split by companies and locations)
  Receives push notifications is geolocated Admin—Back-Office (e.g., application running on server 102 and/or 124)
  Inserts/Edits/disables locations
  Inserts/modifies/disables users
  Assigns users to locations and roles (e.g. user, power user) o Searches/filters/exports users
  Uses the internal chat of the various user groups/locations
  Views the history of all the chats o Send push notifications to all company or location users Legal (super admin)—Back-Office (e.g., application running on server 102 and/or 124)
  Inserts/modifies/clears admin users o Inserts/edits content (different for each site) o Inserts/modifies/disables other legitimate users
  Uses the internal chat of the various companies/locations/user groups/single users o Assigns one or more attorneys to a particular home and/or company
  Views the history of all the chats
  Sends push notifications to all users of a company or location
  Creates of pre-packaged chat messages
  Provide a new section for "useful numbers" in the app. This section will show all the telephone numbers and master data of the attorney group assigned to the location. The user, with a simple tap, will be able to call one of these numbers in case of urgency. The content of this section will be managed by the Legal (Super Admin).

In certain implementations, the system 100 enables real-time communications among devices 104, 106, and/or 108 (and/or interactive applications 118, 120, and 122) to, for example, enable more immediate and effective delivery of legal advice and/or services from a remote device, e.g., device 108, to a local device, e.g., device 104, that is located at a facility such as facility 112.

Figure 2:
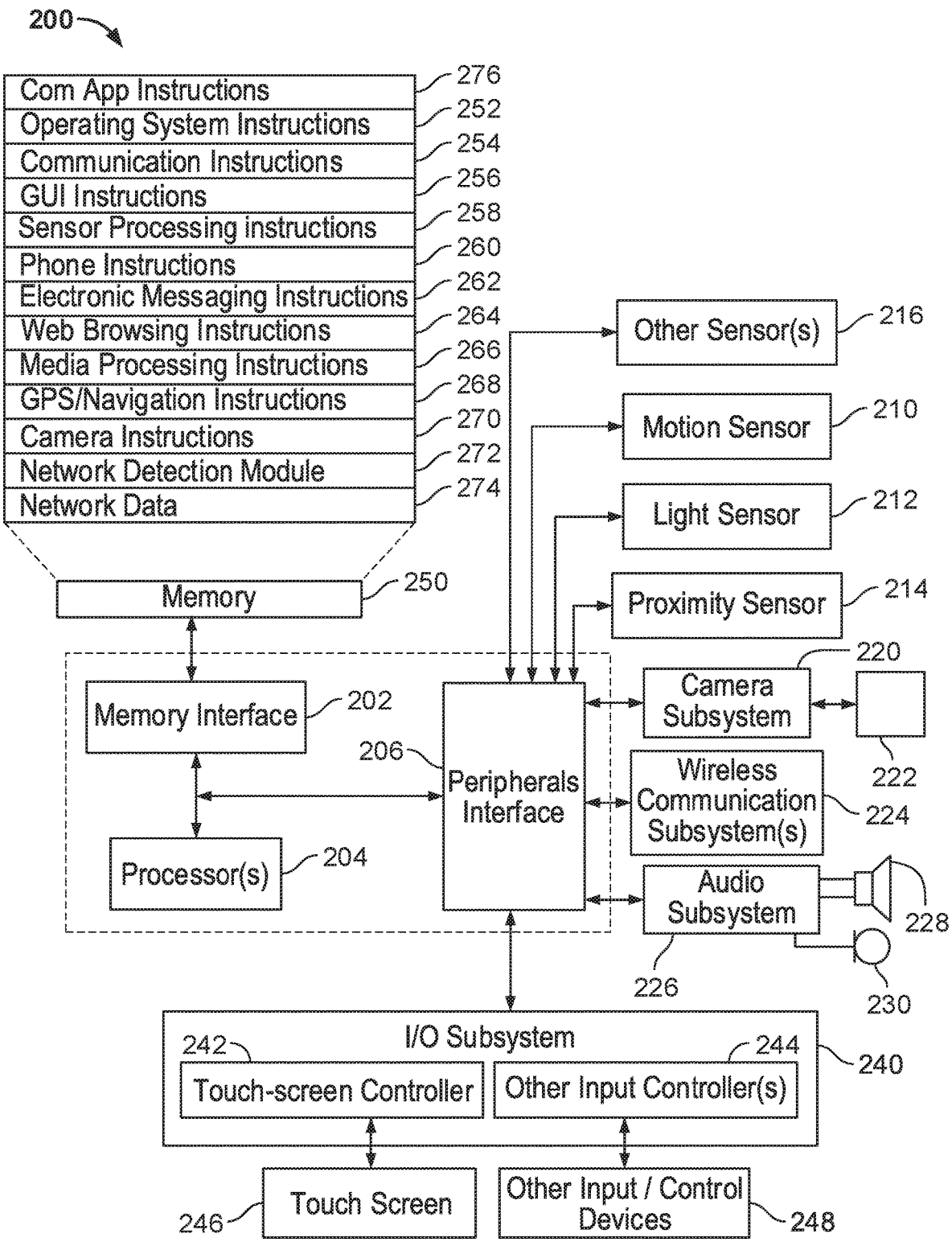

FIG. 2 includes a functional block diagram of a communications device (e.g., mobile device), such as device 104 described in relation to FIG. 1, capable of location based network services. The mobile device can include memory interface 202, one or more data processors, image processors and/or central processing units 204, and peripherals interface 206. Memory interface 202, one or more processors 204 and/or peripherals interface 206 can be separate components or can be integrated in one or more integrated circuits. The various components in the device can be coupled by one or more communication buses or signal lines.

Sensors, devices, and subsystems can be coupled to peripherals interface 206 to facilitate multiple functionalities. For example, motion sensor 210, light sensor 212, proximity sensor 214, position system 278 can be coupled to peripherals interface 206 to facilitate orientation, lighting, proximity, and positioning functions. The position system 278 may be, for example, a GPS receiver, and may provide the functions of a location server, such as that described in reference to FIG. 3. Other sensors 216 can also be connected to peripherals interface 206, such as a temperature sensor, a biometric sensor, magnetic compass, FM or satellite radio, or other sensing device, to facilitate related functionalities.

Camera subsystem 220 and optical sensor 222, e.g., a charged coupled device (CCD) or a complementary metal-oxide semiconductor (CMOS) optical sensor, can be utilized to facilitate camera functions, such as recording photographs and video clips, and viewing areas, as is described above in relation to FIG. 1.

Communication functions can be facilitated through one or more wireless communication subsystems 224, which can include radio frequency receivers and transmitters and/or optical (e.g., infrared) receivers and transmitters. The specific design and implementation of communication subsystem 224 can depend on the communication network(s) over which device 100 is intended to operate. For example, device 104 may include communication subsystems 224 designed to operate over a 5G, network, 4G network, LTE network, CDMA network, GSM network, a GPRS network, an EDGE network, a WiFi or WiMax network, and a Bluetooth™ network. An example of a network over which device 100 may communicate is further described below in relation to FIG. 3. Wireless communication subsystems 224 may also include hosting protocols such that device 100 may be configured as a base station for other wireless devices.

Audio subsystem 226 can be coupled to speaker 228 and microphone 230 to facilitate voice-enabled functions, such as voice recognition, voice replication, digital recording, and telephony functions.

I/O subsystem 240 can include touch screen controller 242 and/or other input controller(s) 244. Touch-screen controller 242 can be coupled to touch screen 246. Touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 246. Touch screen 246 may comprise a touch-sensitive display.

Other input controller(s) 244 can be coupled to other input/control devices 248, such as one or more buttons, rocker switches, thumb-wheel, infrared port, USB port, and/or a pointer device such as a stylus. One or more buttons (not shown) can include an up/down button for volume control of speaker 228 and/or microphone 230.

In one implementation, a pressing of the button for a first duration may disengage a lock of touch screen 246; and a pressing of the button for a second duration that is longer than the first duration may turn power to device 104 on or off. The user may be able to customize a functionality of one or more of the buttons. Touch screen 246 can, for example, also be used to implement virtual or soft buttons and/or a keyboard. In addition to touch screen 246, device 100 can also include a touch pad.

In some implementations, device 104 can capture, store, and present recorded audio and/or video files, such as MP3, AAC, and MPEG files. In some implementations, device 104 can include the functionality of an MP3 player, such as an iPod™. Device 104 may, therefore, include a connector that is compatible with the iPod™. Other input/output and control devices can also be used.

Memory interface 202 can be coupled to memory 250. Memory 250 can include high-speed random access memory and/or non-volatile memory, such as one or more magnetic disk storage devices, one or more optical storage devices, and/or flash memory (e.g., NAND, NOR). Memory 250 can store an operating system 252, such as Darwin, RTXC, LINUX, UNIX, OS X, WINDOWS, or an embedded operating system such as VxWorks. Operating system 252 may include instructions for handling basic system services and for performing hardware dependent tasks. In some implementations, operating system 252 can be a kernel (e.g., UNIX kernel).

Memory 250 may also store communication instructions 254 to facilitate communicating with one or more additional devices, one or more computers and/or one or more servers. Memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/Navigation instructions 268 to facilitate GPS and navigation-related processes and instructions; camera instructions 270 to facilitate camera-related processes and functions; and network detection module 272; network data 274 to facilitate the processes and functions; and augmented reality instructions 276 to facilitate the processing and display of augmented reality data. Memory 250 may also store other software instructions (not shown), such as web video instructions to facilitate web video-related processes and functions; and/or web shopping instructions to facilitate web shopping-related processes and functions. In some implementations, media processing instructions 266 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 250.

Each of the above identified instructions and applications can correspond to a set of instructions for performing one or more functions described above. These instructions need not be implemented as separate software programs, procedures, or modules. Memory 250 can include additional instructions or fewer instructions. Furthermore, various functions of device 104 may be implemented in hardware and/or in software, including in one or more signal processing and/or application specific integrated circuits.

In some implementation, the devices 104, 106, and/or 108 including instructions and/or applications (e.g., the WhatsApp Messenger) to enable implementation of a cross-platform instant messaging and Voice over IP (VoIP) service. The communications application may allow the sending of text messages and voice calls, as well as video calls, images and other media, documents, and user location. The application may run on a communications device 104, 106, and/or 108 (e.g., a mobile device) though it may also be accessible from other types of communications device such as desktop computers. The communication application may use standard cellular mobile numbers. Users associated with wireless communications devices may communicate with other users individually or in groups of individual users. In some configurations, the communications application enables an entity to provide communications to users at scale. In some implementations, data is end-to-end encrypted. A client application may be implemented using XMPP. In some configurations, the server includes an HTTP server. The HTTP server and/or communications management application may implement a store and forward mechanism to exchange messages between a first communications device and a second communications device. When a user sends a message, it is first sent to the server where the message is stored. Then, the server sends the message to a receiving second communications device.

Figure 3:
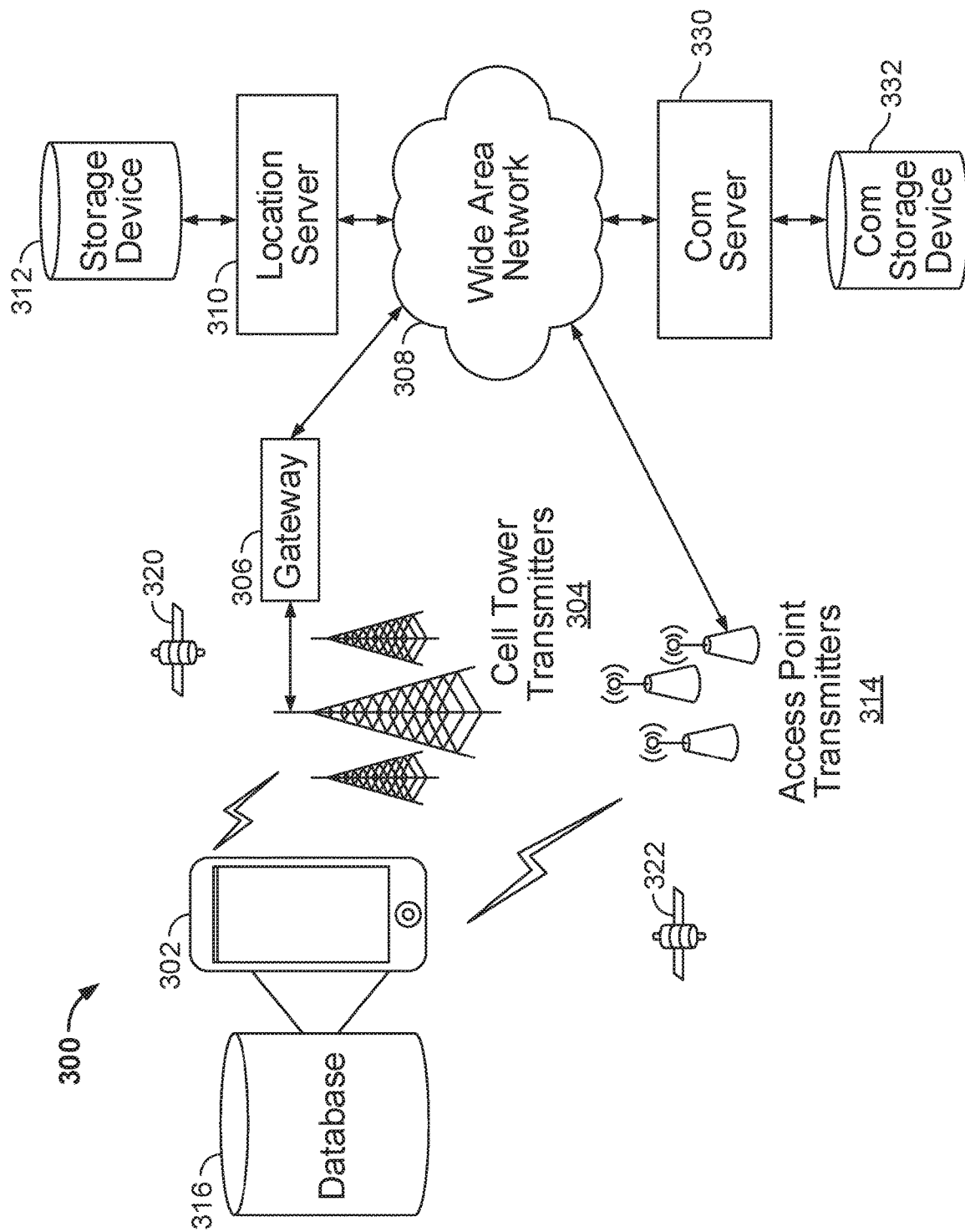

FIG. 3 includes a diagram of a wireless communications system (WCS) 300 which may be included as part of system 100. In some implementations, WCS 300 may include mobile device 302 (or device 104, 106, and 108), cellular tower transmitters 304, access point transmitters 314 (e.g., WiFi beacons), and location server 310. Mobile device 302 may be device 100, described above in reference to FIGS. 1 and 2. Therefore, mobile device 302 can be any communications device capable of determining its current geographic location by communicating with a positioning system, such as GPS, cellular networks, WiFi networks, and any other technology that can be used to provide the actual or estimated location of a mobile device 302. Some examples of mobile devices include but are not limited to: a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices. Mobile device 302 can include a storage device (e.g., flash memory, hard disk) for storing database (DB) 316.

Cellular tower transmitters 304 can be coupled to wide area network 308 (e.g., the Internet) through gateway 306, and access point transmitters 314 can be coupled to network 308 through wired and/or wireless communication links and may interact directly or indirectly with mobile device 302.

In some implementations, mobile device 302 may operate on a cellular network including cellular tower transmitter 304. The cellular network may comprise a first cellular network cluster and second cellular network cluster. Each cellular network cluster may contain a controller and a plurality of base stations. Each base station may cover a single cell of the cellular network cluster, and each base station may communicate through a wireless connection with the controller for call processing, as is well known in the art. Wireless devices communicate via the nearest base station (i.e. the cell the device currently resides in). Roaming functionality is provided when a wireless device roams from one cell to another so that a session is properly maintained with proper signal strength. A controller acts like a telephony switch when a wireless device roams across cells, and it communicates with the controller via a wireless connection so that a wireless device can also roam to other clusters over a larger geographical area. A first controller may be connected to a second controller in a cellular cluster through a physical connection, for example, copper wire, optical fiber, or the like. This enables cellular clusters to be great distances from each other. The controller may in fact be connected with a physical connection to its base stations. Base stations may communicate directly with the controller. Base stations may communicate indirectly to the controller, for example through other base stations. It is well known in the art that many options exist for enabling interoperating communications between controllers and base stations for the purpose of managing a cellular network. A cellular network cluster may be located in a different country.

A base controller may communicate with a controller through a Public Service Telephone Network (PSTN) by way of a first telephony switch, a PSTN, and second telephony switch, respectively. The first and second telephony switches may be private or public. In one cellular network embodiment of the present invention, a server-side data processing system executes at the controllers. A receiving data processing system executes at a mobile device 302, for example a mobile laptop computer, wireless telephone, a personal digital assistant (PDA), or the like. As the mobile device 302 moves about, positional attributes are monitored for determining a situational location. The mobile device 302 may be handheld, or installed in a moving vehicle. Locating a mobile device using wireless techniques such as Time Difference of Arrival (TDOA) and Angle Of Arrival (AOA) are well known in the art. The server-side data processing system may also execute on a server computer accessible to controllers, provided an appropriate timely connection exists between cellular network controller(s) and the server computer. Mobile devices may be known by a unique identifier, for example a caller id, device identifier, or like appropriate unique handle.

Locating functionality can be provided to mobile device 302 through local automatic location detection means or by automatic location detection means remote to mobile device 302. Automatic location detection means determines the whereabouts of a device, and examples include GPS (Global Positioning System) chips, GPS accessories, blue-tooth connected GPS, triangulated location determination, cell-tower triangulated location, antenna triangulated location, in-range proximity based location detection, combinations thereof, or by any other automatic location detection means. This disclosure supports any device with GPS functionality regardless of how the GPS functionality is provided to, or for, the device. Many mobile devices may be blue-tooth enabled which provides the ability to adapt GPS locating means to the device. This disclosure also supports proximity location means which involves a device coming within range of a detecting means for determining a known location. Being within range of the detecting means implies locating the device by associating it to the location of the detecting means. There are various wireless detection methods and implementations well-known in the art for knowing when a device comes into range of communications.

In an aspect of the disclosure, GPS satellites such as satellite 320 and satellite 322, provide information, as is well known in the art, to GPS devices on earth for triangulation locating of the GPS device. In this embodiment, a mobile device 302 has integrated GPS functionality so that the mobile device 302 monitors its positional attribute(s). When the mobile device 302 determines a candidate delivery event, it communicates parameters to the controller by way of the nearest base station.

Location server 310 can include one or more server computers operated by a location service provider. Location server 310 can deliver location information to mobile device 302. In some implementations, mobile device 302 collects and stores network information associated with transmitter detection events. The network information can include a transmitter identifier (ID) of a detected transmitter, a timestamp marking a time of the transmitter detection event and a location, if available. Some examples of transmitter IDs include but are not limited to Cell IDs provided by cell tower transmitters 304 in a cellular communications network (e.g., transmitters on GSM masts) and access point transmitter 314 IDs (e.g., a Media Access Control (MAC) address). A wireless access point (AP) (such as that represented by access point transmitters 314) can be a hardware device or a computer's software that acts as a communication hub for users of a wireless device to connect to a wired LAN. Other examples of cellular network information include Mobile Country Code (MCC), Mobile Network Code (MNC) and Location Area Code (LAC).

The transmitter IDs can be correlated with known geographic locations of corresponding transmitters. The geographic locations of the transmitters can be used to compute estimated position coordinates (e.g., latitude, longitude, altitude) for mobile device 302 over a period of time. For example, a sequence of transmitter IDs can be compared with a reference database (e.g., Cell ID database, WiFi reference database) that maps or correlates the transmitter IDs to position coordinates of corresponding transmitters, and computes estimated position coordinates for mobile device 302 based at least in part on the position coordinates of the corresponding transmitters. If a reference database is available on mobile device 302, then the mapping can be performed by a processor of mobile device 302. Alternatively, the transmitter IDs can be sent to location server 310 which can store transmitter position coordinates in a remote reference database in storage device 312. Location server 310 can map or correlate transmitter IDs to position coordinates of corresponding transmitters which can be sent back to mobile device 302 through network 308 and one or more wireless communication links. The position coordinates can be reverse geocoded to map locations (e.g., street locations). The map locations can be represented by markers (e.g., pushpin icons) on a map view displayed by mobile device 302, or used for other purposes by mobile applications. The position coordinates and associated timestamps can be stored in database 316 and/or storage device 312 for subsequent retrieval and processing by a user or application. The position coordinates and timestamps can be used to construct a timeline in a map view showing a history of locations for mobile device 302.

Similarly, communications server 330 can include one or more server computers operated by an entity or service provider. For example, the service provider may be a clothing vendor, store, or other suitable provider. Communications server 330 can deliver service or chat information to mobile device 302. Server 330 can provide service and/or chat information which can be sent back to mobile device 302 through network 308 and one or more wireless communication links. In some configurations, server 330 includes information and/or data sent to and/or used by a communications application 118, 120, and/or 122 running communications instructions 276 to present entity and/or user data via a display and/or touch screen 246, as illustrated in FIG. 1. In some configurations, the device 104, 106, and/or 108 may function as a client device in a client-server configuration with a communications management application running on the server 330 to present alerts, notifications, and/or entity information, or facilitate real-time communications and/or chat services, such as discussed with respect to FIG. 1, via touch screen 246. The available services, entity data, and/or user information may be determined by the location of the mobile device 302 and/or device 104 (or device 106 or device 108), which may be determined in the manner described above. The services and/or data can be represented by markers (e.g., an image of the data and a link to the data content in a database such as database 332, 126, or 128, and/or a website) on a map view displayed by mobile device 302, or used for other purposes by mobile applications. The service and/or entity data information can be stored in database 316 and/or storage device 332, 126, and/or 128 for subsequent retrieval and processing by a user or application. The services, user data, and/or entity data viewed can be used to construct a history of services, entity data distribution, entity data use, entity data capture, and/or user interactions, for mobile device 302 and/or device 102 (or any other device 104 and 106 of system 100).

A baseband processor in mobile device 302 can be used in a RF subsystem to transmit and receive RF signals in, for example, a 5G (Fifth Generation) mobile service, 4G (Fourth Generation) mobile service, 3G (Third Generation) mobile service, an IMT-Advanced Standard (International Mobile Telecommunications-Advanced) service, an LTE (Long Term Evolution) mobile service, a CDMA (Code Division Multiple Access) mobile service, GSM (Global System for Mobile communications), GPRS (General Packet Radio Service) and EGPRS (Enhanced General Packet Radio Service). During reception of RF signals, the RF subsystem receives RF signals, converts the RF signals into baseband signals and sends the baseband signals to the baseband processor. Thereafter, the baseband processor processes the received baseband signals to decodes various data from the baseband signals.

In some implementations, mobile device 302 can store network information (e.g., transmitter IDs) for wireless cellular networks that have communicated with mobile device 302. The network information and location where the communication occurred can be stored in a local database (e.g., database 316) on mobile device 302. When mobile device 302 determines that it is operating at a location previously stored in the database (e.g., determined by matching current GPS location data with stored locations), then the stored network information corresponding to the matched stored location can be used to narrow a search for available wireless cellular networks at the matched location. For example, when mobile device 302 wakes up or exits a mode where wireless access was not available (e.g., an "airplane mode"), the matched location of the mobile device 302 can be used to determine a list of wireless cellular networks that are potentially available for access at the matched location.

In some implementations, location-sorted network information can be pre-stored on mobile device 302 even if mobile device 302 has never been at the matched location.

In some implementations, the list of wireless cellular networks can be searched in order based on one or more characteristics or attributes of the transmission signal. For example, signal strength can be recorded as part of the network information and used to narrow a search to only those wireless cellular networks potentially accessible at the location and that have signal strengths that exceed a certain threshold. In some implementations, the location-sorted network information can include the frequency band and channel information (e.g., for 5G, 4G, 3G, 2G) for each network in the approximate location of the mobile device 302 to significantly reduce network search time even further.

In some implementations where the mobile device is being operated in a new location (no previously stored network information), a broadcast radio system in the device 302 can be used to determine an approximate location of mobile device 302.

Current technology enables devices to communicate with each other, and other systems, through a variety of heterogeneous system and communication methods. Current technology allows executable processing to run on diverse devices and systems. Current technology allows communications between the devices and/or systems over a plethora of methodologies at close or long distance. Many technologies also exist for automatic locating of devices. It is well known how to have an interoperating communications system that comprises a plurality of individual systems communicating with each other with one or more protocols. As is further known in the art of developing software, executable processing of the present invention may be developed to run on a particular target data processing system in a particular manner, or customized at install time to execute on a particular data processing system in a particular manner.

FIG. 4A shows a table 400 of user identifiers associated with a first group (e.g., Group A). The table 400 may reside within database 128 and/or 126, and/or reside within a memory of device 104, 106, and/or 108. While table 400 shows a listing of user IDs with associated locations, additional information may be stored and associated with user IDs. For example, table 400 may include user names, user addresses, user telephone/mobile numbers, users' title, users' authorities, user device locations (including GPS coordinates), users' passwords, encryption key, access rights, and so on. Such information may be used by system 100 to enable communications among users and enable selective access to sensitive information associated with a user group such as Group A. In some configurations, Group A may include employees of a company associated with a company facility or organization.

FIG. 4B shows another table 450 of user identifiers associated with a second group. The table 450 may reside within database 128 and/or 126, and/or reside within a memory of device 104, 106, and/or 108. While table 450 shows a listing of user IDs with associated locations, additional information may be stored and associated with user IDs. For example, table 450 may include user names, user addresses, user telephone/mobile numbers, users' title, users' authorities, user device locations (including GPS coordinates), users' passwords, encryption key, access rights, and so on. Such information may be used by system 100 to enable communications among users and enable selective access to sensitive information associated with a user group such as Group B. In some configurations, Group B may include legal professionals assigned to provide legal advice to company employees associated with company facility.

FIG. 5 shows a table 500 of facilities. The table 500 may reside within database 128 and/or 126, and/or reside within a memory of device 104, 106, and/or 108. While table 500 shows a listing of facility IDs with associated locations, additional information may be stored and associated with facility IDS. For example, table 500 may include facility names, facility addresses, facility telephone/mobile numbers, facility descriptions, access codes, access passwords, and so on. Such information may be used by system 100 to enable communications among users and enable selective access to sensitive information associated with various facilities.

FIG. 6 shows a table 600 of data and associated information stored by a server 102 or 124 (in a database 128 or 126 respectively) and/or communication device 104, 106, or 108 according to aspects of the disclosure. In certain implementations, system 100 may capture, record, and/or store data associated with communications among user devices 104, 106, and 108. In one implementation, server 102 functions as an intermediary of communications among and between user devices 104, 106, and 108, in which case, whereby communications pass through server 102. Server 102 may store all data and communications, and/or record all chat sessions, along with adding metadata to captured data including timestamps related to actions associated with the data (e.g., date/time of capture, date/time of transmission or distribution, date/time of delivery to third part, date/time of changes/edits, and so on). Table 600 may include, without limitation, images, notes, texts, messages, audio recordings, video recordings, chat information, investigation status information, and so on, along with timestamps associated with actions related to such data. Such data may be searched and/or retrieved by users via, for example, applications 118, 120, and 122, or searched and retrieved by administrators with access to server 102. The table 600 may include a relational database having a standard user and application program interface such as structured query language (SQL). Data stored in table 600 may be arranged and/or searchable in various ways including based on facility, group, investigation, date/time, users, event type, and so on. In certain implementations, data may be arranged and/or presented to users in a time-based sequential order or another manner to convey history and/or status of one or more investigations associated with one or more facilities.

Regulatory authorities around the world often conduct surprise onsite inspections called "dawn raids." A dawn raid is stressful for any company's employees. It is also risky for the company: if employees do not behave appropriately, the company can be fined. Even if completely innocent, the company may still face significant problems due to any procedural irregularities during the dawn raid. To minimize the risk of fines, and lay the groundwork for a solid defense, it is important to handle things correctly from the moment a dawn raid starts. Communications system 100 can be implemented to offer real-time practical assistance and guidance in the event of a dawn raid. For example, communications system 100 can allow users to interact with internal and/or external lawyers and receive real-time instructions. Every employee of a company can have access to communications system 100 in order to implement secure and efficient management of inspections. Communications system 100 can provide practical guidelines for each phase of the inspection, tailored to the user's role (i.e., management, legal, other employees).

Figure 7:
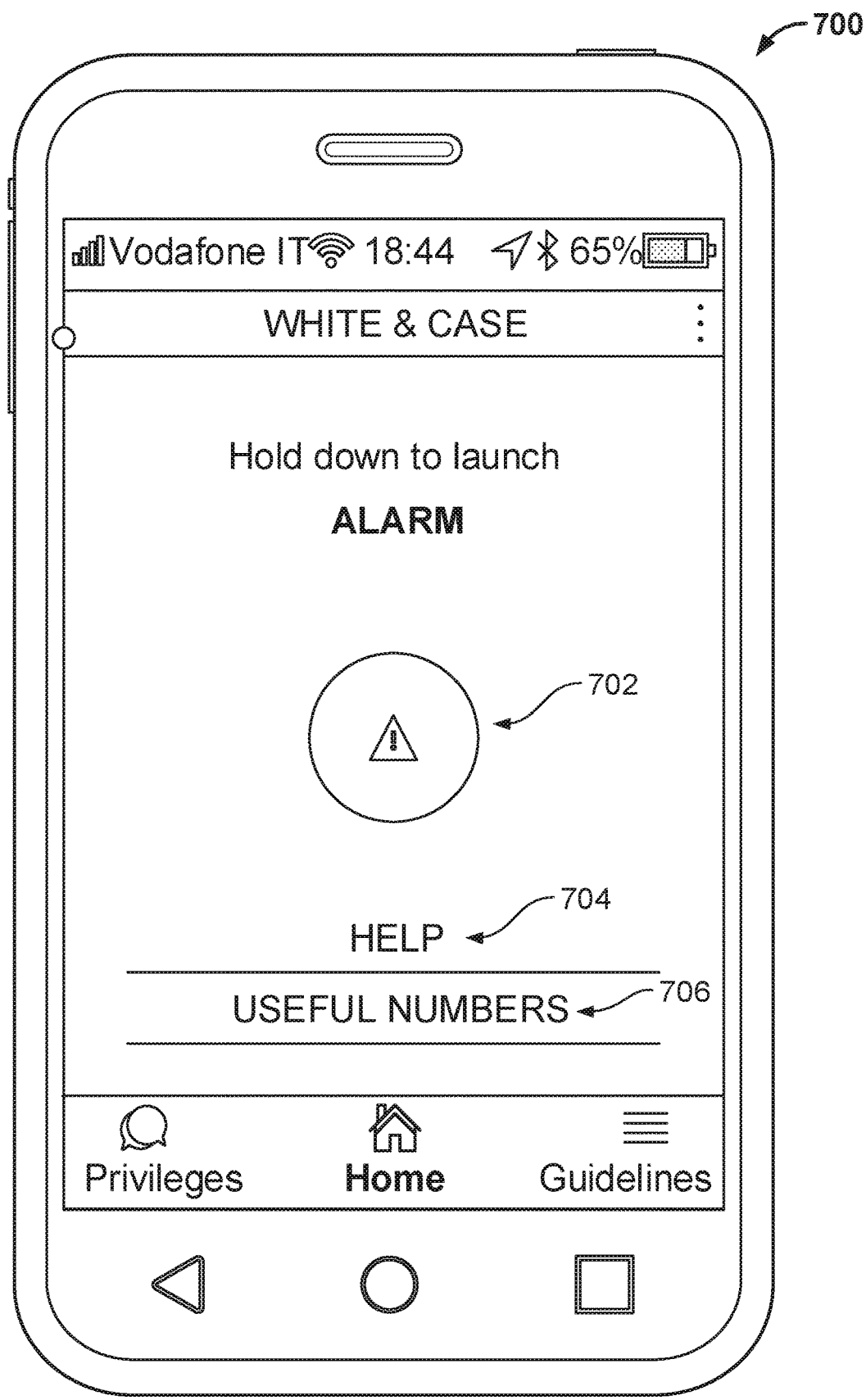
FIG. 7 shows a first illustration of a communications device application according to aspects of the disclosure.

FIGS. 7-12 show example illustrations of a communications device application (e.g., applications 118, 120, and 122). FIG. 7 shows an illustration of a home page 700 of the communications device application that is intuitive and easy to access in the event of an emergency. The application can include buttons 702, 704, and 706. For example, a user can press alarm button 706 when first alerted of an emergency, i.e., a dawn raid. As described in relation to FIGS. 1-6, by pressing button 706 the user can initiate an alert in communications system 100. Help button 704 can be pressed to access guidelines on dawn raids that are accessible offline. Useful numbers button 706 can be pressed to access instructions on how to send an alert to key contacts.

Figure 8:
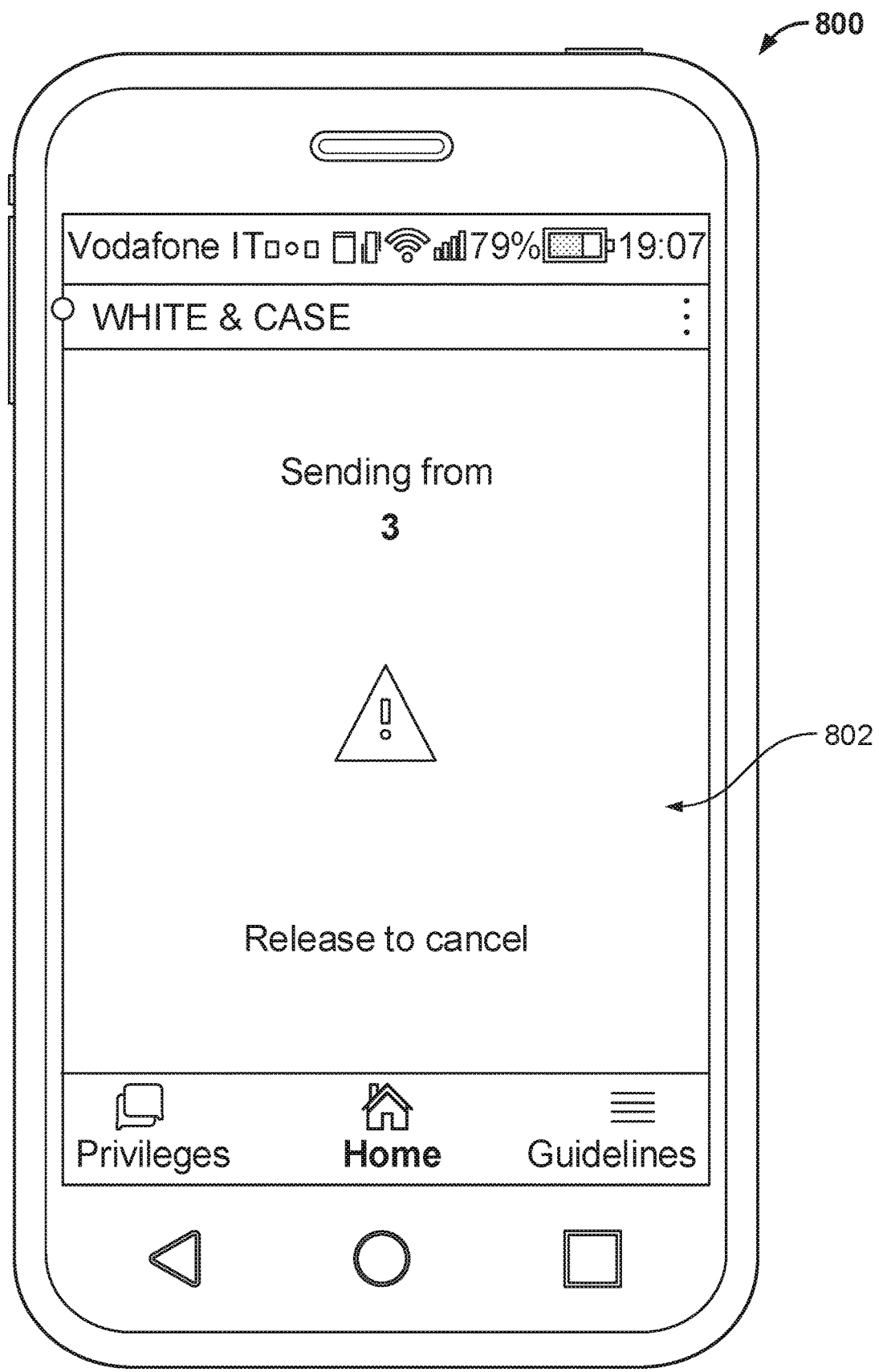
FIG. 8 shows a second illustration of the communications device application according to aspects of the disclosure.
Figure 9:
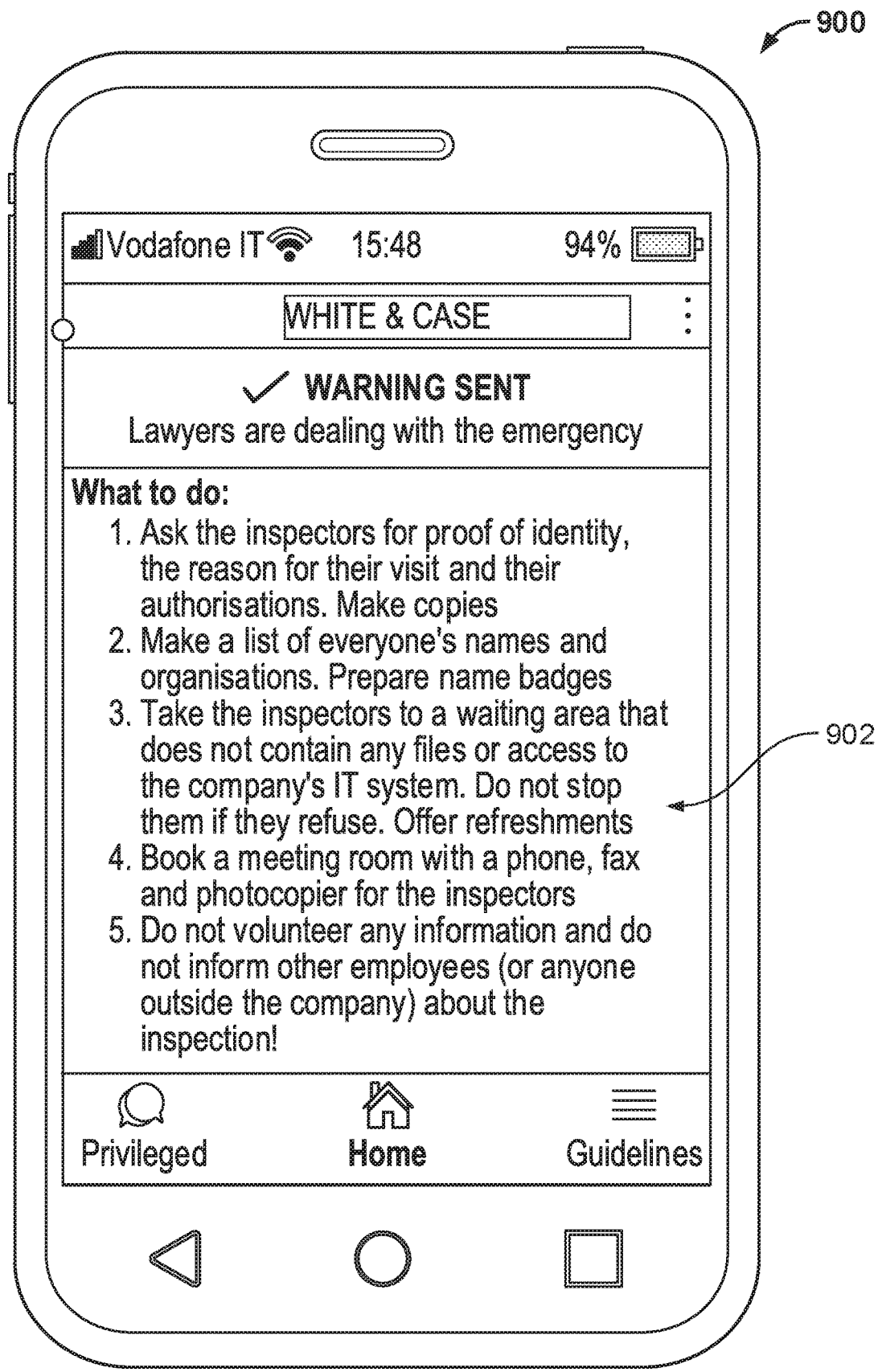
FIG. 9 shows a third illustration of the communications device application according to aspects of the disclosure.
Figure 10:
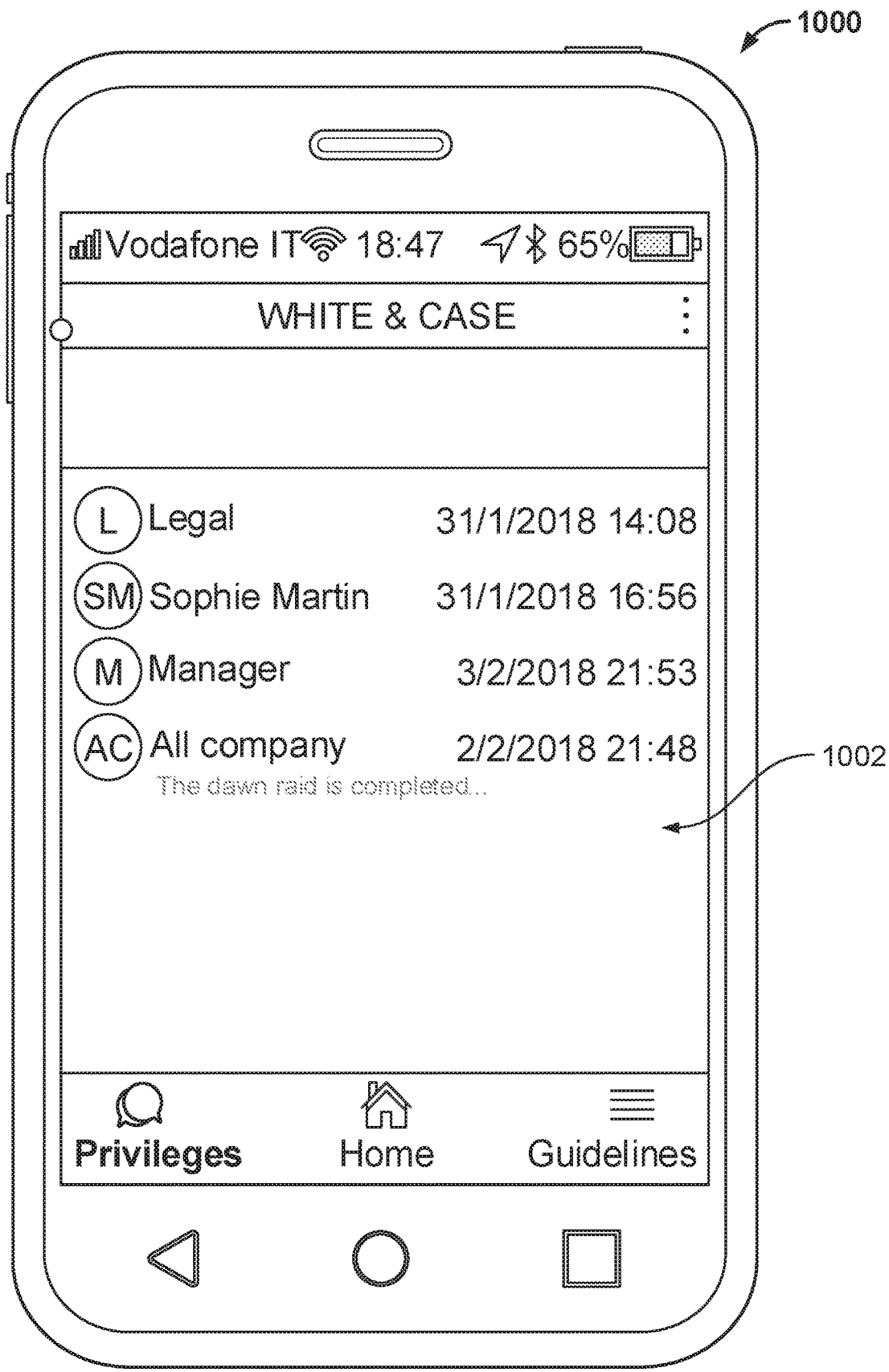
FIG. 10 shows a fourth illustration of the communications device application according to aspects of the disclosure.
Figure 11:
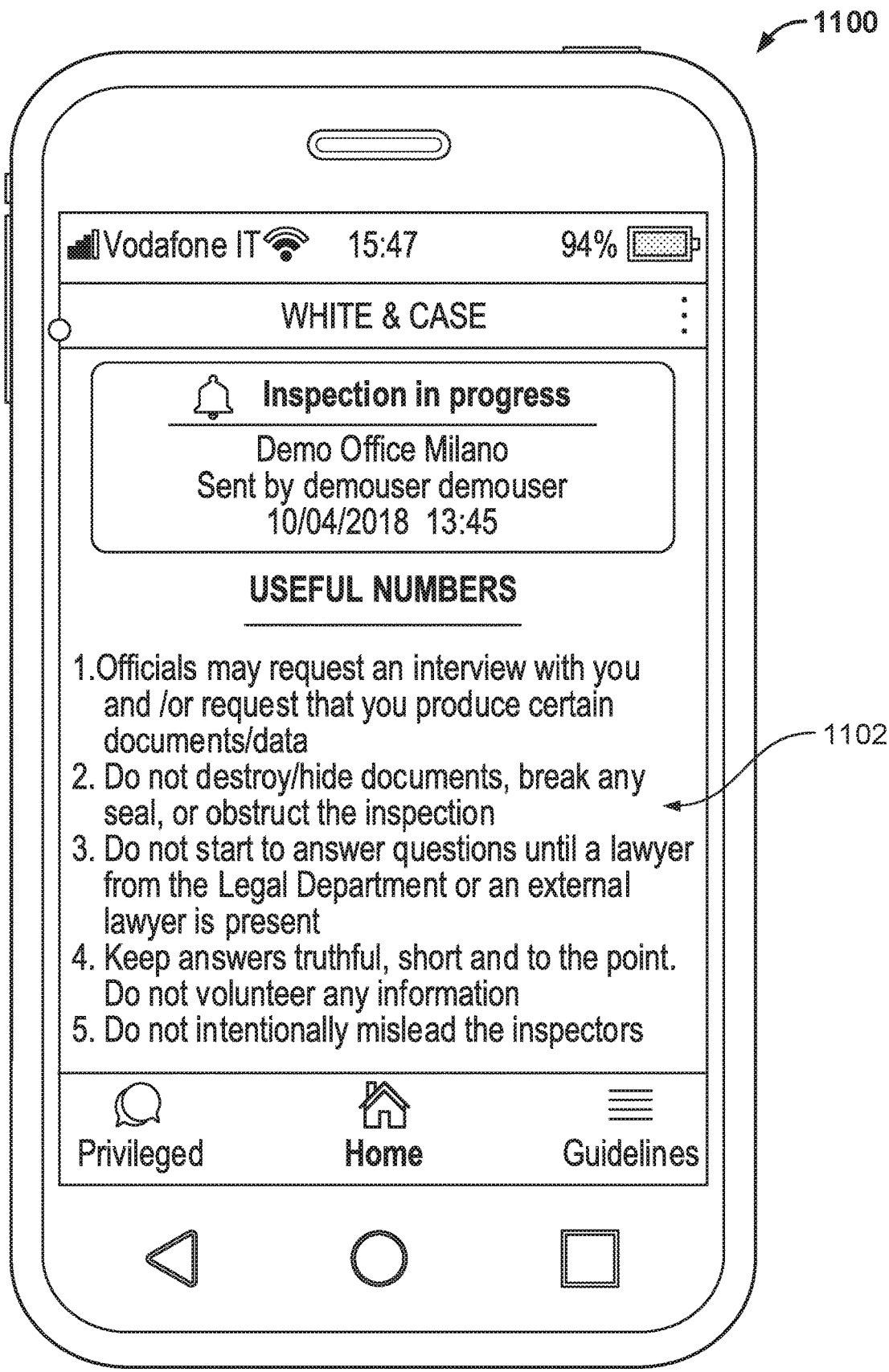
FIG. 11 shows a fifth illustration of the communication device application according to aspects of the disclosure.

FIG. 8 shows another illustration of the communications device application after a user has pressed alarm button 706 as shown in FIG. 7. By pressing and holding the red button 706 for 3 seconds, a message will be sent to internal and external lawyers and management and the application screen 802 will turn red. The alert can be received instantaneously by all designated company personnel. FIG. 9 shows a checklist 902 which allows the user to i) take a photo of the decision authorizing the inspection and send it to internal/external lawyers, ii) record an audio message and send it to internal/external lawyers, and iii) access standard models and templates that can FIG. 10 shows an illustration of a geo-locator page 1002 of the communications device application. Geo-locator page 1002 provides the location of each external lawyer and allows users to i) receive an alert, ii) interact with their internal and external lawyers, iii) receive real-time updates and instructions, and iv) access guidelines on how to handle each phase of the inspection. FIG. 11 shows an illustration of a status notification 1102 in the communications device application. Status notification 1102 allows users to receive pop-up messages on their mobile phone on the status of the event or dawn raid. By opening the message, the user is redirected to advice corresponding to the stage of the inspection. Users receive ad hoc guidance for each step of the event or dawn raid.

Figure 12:
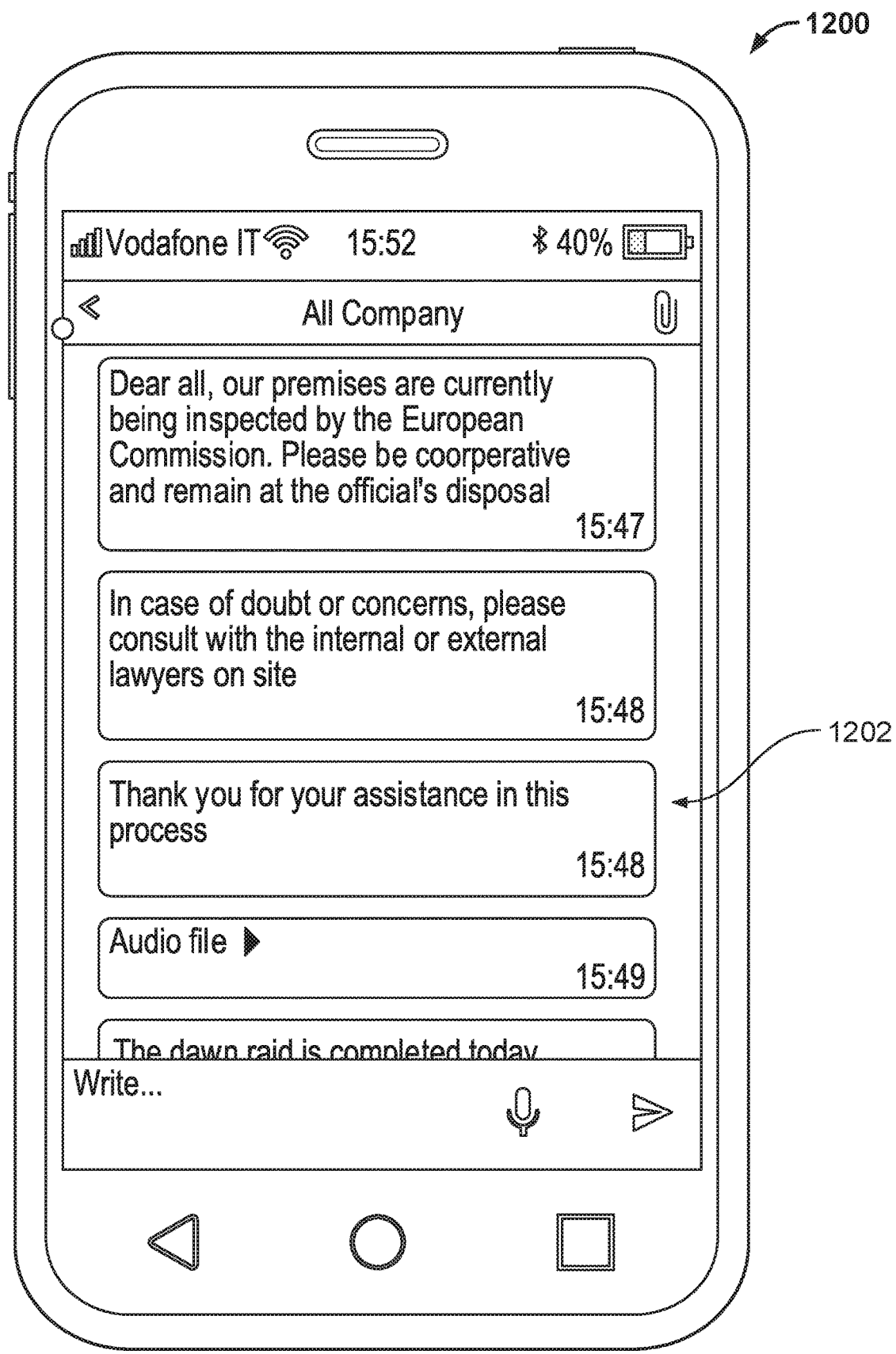
FIG. 12 shows a sixth illustration of the communication device application according to aspects of the disclosure.

FIG. 12 shows an illustration of a real-time messaging page 1202 of the communications device application. The messaging page 1202 can be covered by legal privilege and can be encrypted. The messaging page 1202 can include multiple chats running concurrently. Each user can receive ad hoc immediate instructions/advice according to the user's role. Messaging page 1202 allows the team to respond rapidly to the inspection.

It will be apparent to those of ordinary skill in the art that certain aspects involved in the operation of the server and communications devices may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

Those skilled in the art will know or be able to ascertain using no more than routine experimentation, many equivalents to the embodiments and practices described herein. Accordingly, it will be understood that the invention is not to be limited to the aspects disclosed herein, but is to be understood from the following claims, which are to be interpreted as broadly as allowed under the law.

What is claimed is:

1. A communications system comprising:
   multiple geographically distributed facilities including a first facility being located at a first location;
   a first communications device arranged to: i) send an alert to a communications server and ii) receive a message from the communications server in response to the alert, the first communications device being within a first proximity of the first facility, wherein the alert indicates an event type, and wherein the event type is selected from the group consisting of a raid, an inspection, an investigation, a demand for information, an order of entrance, a confiscation action, a seizure action, an arrest, and execution of a search warrant;
   a second communications device arranged to receive a notification from the communications server associated with the alert, the second communications device being within a second proximity of the first facility; and
   a data storage device arranged to store the first location, a detected location of the first communications device, and a detected location of the second communications device;
   wherein the communications server is in electronic communication with the first and second communications devices via a network and is arranged to:
      receive the alert from the first communications device;
      determine that the second proximity of the second communications device is within a proximity threshold of the first facility, wherein the second proximity is determined by comparing the first location with the detected location of the second communications device; and
      send the notification associated with the alert to the second communications device;
   wherein the notification includes the event type, an identifier of the first facility, and a user identifier of the user associated with the first communications device;
   wherein an encrypted communications connection between a first chat application of the first communications device and a second chat application of the second communications device is established;
   wherein the data storage device is configured to store data communicated via the encrypted communications connection and create and maintain a legally privileged record of events;
   wherein the message includes instructions based on the event type and an indication of a distance of the second communications device from the first location and an amount of time for the second communications device to arrive at the first location when traveling toward the first location; and
   wherein the first communications device includes an image capture device arranged to capture one or more images associated with the event type, said one or more images being selected from the group consisting of an order of entrance, a search warrant, a seizure order, and a demand.

2. The system of claim 1, comprising a third communications device arranged to receive the notification from the communications server associated with the alert, the third communications device being within a third proximity of the first facility, the third proximity being within the proximity threshold of the first facility.

3. The system of claim 1, wherein the first chat application and the second chat application are clients of a communications management application.

4. The system of claim 1, wherein the encrypted communications are between the first chat application of the first communications device, the second chat application of the second communications device, and a third chat application of a third communications device, the third chat application being a client of a communication management application.

5. The system of claim 1, wherein the first communications device sends the one or more images to at least one of the communications server, the second communications device, and a third communications device.

6. The system of claim 1, wherein a first user is associated with the first communications device, a second user is associated with the second communications device, and a third user is associated with a third communications device.

7. The system of claim 6, wherein the first user and second user are members of a first group and the third user is a member of a second group.

8. The system of claim 7, wherein the members of the first group are determined by a first administrator and the members of the second group are determined by a second administrator.

9. The system of claim 1, wherein a language of one of the alert, message, and notification is based on a detected geographic location of the first or second communications device.

10. The system of claim 1, wherein the message includes an indication of at least one of a distance of a third communications device from the first location and an amount of time for the third communications device to arrive at the first location when traveling toward the first location.

11. The system of claim 1, wherein the data includes at least one of an image, notes, text, messages, audio recordings, video recording, status of the event, status of a response to the event, status of information provided to a third party, time stamps associated with captured data, a history of captured data over a period of time, and other chat information.

12. The system of claim 11, wherein at least one of the first communications device, the second communications device, and a third communications device stores a portion of the data.

13. The system of claim 1, comprising a second server that separately supports chat features among the first and second chat applications of the first communication device and the second communication device while coordinating with the communications server which is in electronic communication with the first communication device and the second communication device and which is configured for receiving alerts.

14. A method of communication comprising:
providing multiple geographically distributed facilities including a first facility being located at a first location;
providing a first communications device arranged to: i) send an alert to a communications server and ii) receive a message from the communications server in response to the alert, the first communications device being within a first proximity of the first facility, wherein the alert indicates an event type, and wherein the event type is selected from the group consisting of a raid, an inspection, an investigation, a demand for information, an order of entrance, a confiscation action, a seizure action, an arrest, and execution of a search warrant;
providing a second communications device arranged to receive a notification from the communications server associated with the alert, the second communications device being within a second proximity of the first facility; and
providing a data storage device arranged to store the first location, a detected location of the first communications device, and a detected location of the second communications device;
wherein the communications server is in electronic communication with the first and second communications devices via a network and is arranged to:
receive the alert from the first communications device;
determine that the second proximity of the second communications device is within a proximity threshold of the first facility, wherein the second proximity is determined by comparing the first location with the detected location of the second communications device; and
send the notification associated with the alert to the second communications device;
wherein the notification includes the event type, an identifier of the first facility, and a user identifier of the user associated with the first communications device;
wherein an encrypted communications connection between a first chat application of the first communications device and a second chat application of the second communications device is established;
wherein the data storage device is configured to store data communicated via the encrypted communications connection and create and maintain a legally privileged record of events;
wherein the message includes instructions based on the event type and an indication of a distance of the second communications device from the first location and an amount of time for the second communications device to arrive at the first location when traveling toward the first location; and
wherein the first communications device includes an image capture device arranged to capture one or more images associated with the event type, said one or more images being selected from the group consisting of an order of entrance, a search warrant, a seizure order, and a demand.

15. A communications system comprising:
multiple geographically distributed facilities including a first facility being located at a first location;
a first communications means for i) sending an alert to a communications server and ii) receive a message from the communications server in response to the alert, the first communications means being within a first proximity of the first facility, wherein the alert indicates an event type, and wherein the event type is selected from the group consisting of a raid, an inspection, an investigation, a demand for information, an order of entrance, a confiscation action, a seizure action, an arrest, and execution of a search warrant;
a second communications means for receiving a notification from the communications server associated with the alert, the second communications means being within a second proximity of the first facility; and
a means for storing the first location, a detected location of the first communications means, and a detected location of the second communications means; and
wherein the communications server is in electronic communication with the first communications means and the second communication means via a network and includes means for:
receiving the alert from the first communications means;
determining that the second proximity of the second communications means is within a proximity threshold of the first facility, wherein the second proximity is determined by comparing the first location with the detected location of the second communications means; and
sending the notification associated with the alert to the second communications means;
wherein the notification includes the event type, an identifier of the first facility, and a user identifier of the user associated with the first communications means;
wherein a server establishes an encrypted communications connection between a first chat application of the first communications means and a second chat application of the second communications means;
wherein the data storage device is configured to store data communicated via the encrypted communications connection and create and maintain a legally privileged record of events;
wherein the message includes instructions based on the event type and an indication of a distance of the second communications means from the first location and an amount of time for the second communications means to arrive at the first location when traveling toward the first location; and
wherein the first communications device includes an image capture device arranged to capture one or more images associated with the event type, said one or more images being selected from the group consisting of an order of entrance, a search warrant, a seizure order, and a demand.

* * * * *